April 9, 1957 F. W. MALONE 2,788,226
FREELY LATERALLY SHIFTABLE TRACTOR HITCH
Filed Dec. 1, 1953
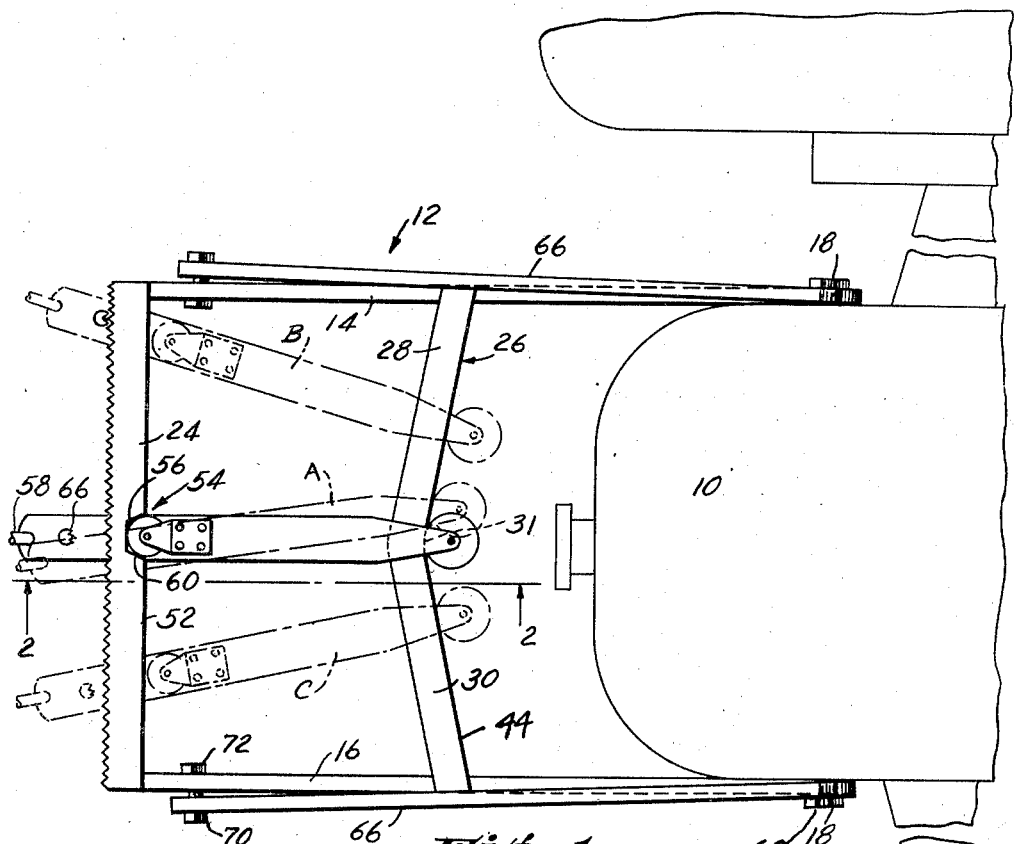
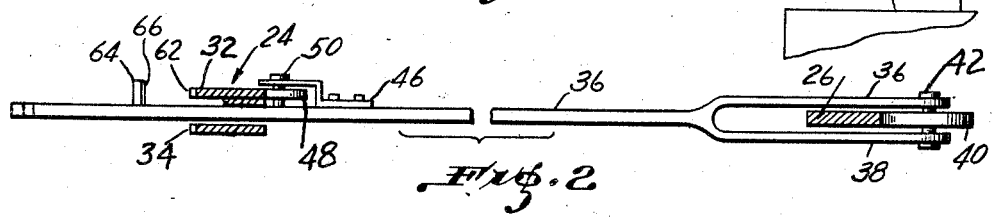
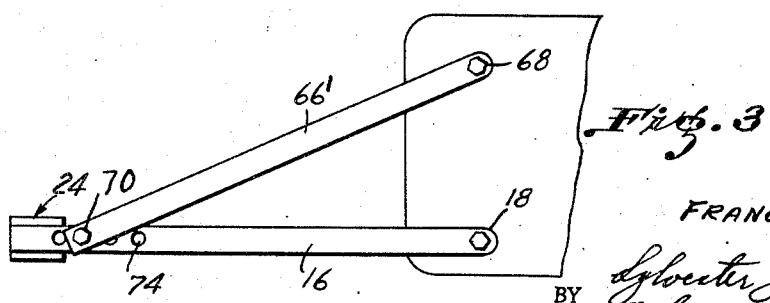
INVENTOR
FRANCIS W. MALONE
BY
ATTORNEY

United States Patent Office 2,788,226
Patented Apr. 9, 1957

2,788,226

FREELY LATERALLY SHIFTABLE TRACTOR HITCH

Francis W. Malone, Chase, Kans.

Application December 1, 1953, Serial No. 395,358

4 Claims. (Cl. 280—447)

This invention relates to improvements in draft or coupling means for connecting road or land vehicles or implements and in particular to an improved tractor hitch.

In ploughing and similar farming activities it is often necessary to turn a tractor and implement around and also to back up. With the usual type of hitch such movements are not satisfactorily accomplished. This is particularly true of backing up or reversing and in making "tight" turns. It is therefore an object of this invention to provide a tractor hitch with which such procedures can be easily performed.

Another object of my invention is to provide a hitch which can be easily attached to a tractor vehicle.

Still another object of this invention is to provide a hitch with which the line of pull or draft shifts during turning.

According to the invention the line along which pull is transmitted to the implement or vehicle being towed shifts laterally of the tractor when making a turn. As a result the line along which draft is transmitted intersects the longitudinal axis of the tractor ahead of the point at which such line would intersect the longitudinal axis, if a common hitch were used.

A further object of this invention is to provide a tractor hitch in which the line of draft or pull can shift as needed, yet in which the line of draft or pull will automatically return into longitudinal alignment with the longitudinal axis of the tractor when a turning movement of tractor and towed device is completed.

Also an object of my invention is to provide a tractor hitch with provision for lateral shifting of the line along which draft is transmitted with which such lateral shifting will not occur when slight changes in directon of movement are made. Thus there is greater control over the movements of the towed device than if the line of draft were permitted to shift whenever slight changes in direction were made.

Yet another object of this invention is to provide a tractor hitch in which reversing movements of the tractor and towed vehicle are facilitated. This is accomplished by providing a means for shifting the line of application of force (pushing force) with a means for fixing such line with respect to the tractor longitudinal axis in accordance with a given degree force in turning, when reversing. Although free movement, within certain limits is permitted at all times when making a forward turn, free pivotal movement is possible only when adjusting the radius of turn when moving in reverse. Thus more positive control of the direction of movement of the towed vehicle is assured than if completely free pivotal movement is possible when reversing.

A still further object of my invention is to provide a hitch accomplishing the above objects which can be adjusted vertically.

These and other objects and advantages will become apparent from the following description and the accompanying drawings, in which:

Figure 1 is a bottom plan view showing a hitch constructed in accordance with the invention attached to a tractor.

Figure 2 is a fragmentary sectional side elevational view taken along line 2—2 of Figure 1.

Figure 3 is a side elevational view.

Similar reference characters in the several figures represent similar parts.

Referring now in particular to the drawings, reference character 10 indicates a tractor while numeral 12 indicates the hitch. The hitch comprises spaced side bars 14 and 16, each of which have their forward ends pivotally connected to the tractor by bolts 18.

At their rear end the side bars are interconnected by lateral member 24, while an intermediate lateral member 26 interconnects the side bars adjacent their middle portions.

The intermediate lateral member is shown to curve or extend rearwardly inwardly of its connection to the side bars to a point substantially central of bars 14 and 16. It might be considered that legs 28 and 30 converge rearwardly to apex 31.

As shown more clearly in Figure 2, rear member 24 comprises spaced parallel upper and lower elements 32 and 34 respectively.

Hitch bar 36 is a generally symmetrical bar which at its rear extends between elements 32 and 34. At its forward end the bar is bifurcated and has parallel legs 36 and 38. Lateral member 26 is received within legs 36 and 38. Roller 40 is pivotally connected to bar 36 forwardly of member 26 by pin 42. The forward vertical side of member 26 forms a trackway 44 which is normally engaged by roller 40.

Bracket 46 is fastened to bar 36 at a point intermediate its ends. Roller 48 is pivotally secured in bracket 46 by pin 50. The forward edge of lower element 34 forms a trackway 52.

Trackway 52 has a central portion 54 thereof which extends or curves rearwardly into element 32 to form an opening 56. Roller 48 is positioned on bar 36 so as to seat within the central opening 56 against trackway 52 with roller 40 seated on trackway portion 54 when a direct forward pull is transmitted to plow hitch 58.

When a slight turning movement of the tractor is made roller 40, bar 36 and roller 48 will move to the position A shown in phantom lines. Note that roller 48 has moved up the side 60 of trackway 52, but that the draft is still being transmitted substantially centrally of the hitch. However, when a substantial forward turning movement is made the hitch bar takes the positions B or C, depending upon whether a right or left hand turn is made. It is seen that roller 48 has moved out of the central cut-out or depressed portion 54, and that the angle of the longitudinal axis of the hitch bar 36 with respect to the longitudinal axis of the tractor changes by virtue of the roller-trackway elements. The towed vehicle or implement thus does not follow the movement of the hitch framing, but moves to the "inside" of a turn. This lessens the forward pull needed for movement of the tractor and facilitates movement of the tractor around the turn. The towed vehicle or implement will automatically return to center when straight forward motion is resumed.

Upper rear lateral member 32 has a roughened rear vertical edge 62. As shown tooth-like elements may be provided. A pin 64 is attached to bar 36 and projects upwardly thereof.

Pin 64 has a roughened edge 66 providing projections and depressions complementary to those provided on member 32. Also, the forked forward end of bar 36 is large enough to permit forward movement, or forward movement coupled with angling movement of the bar with respect to frame 12, until pin 64 engages roughened surface 62.

When straight line backward movement is had pin 64 moves directly into contact with member 32 centrally thereof. When a backing turn is made pin 64 will seat on member 32 after the degree of turn is adjusted. This gives positive control of the radius of turn even in soft earth.

Vertical adjustment of the hitch is possible by virtue of adjustment bars 66'. The latter bars are pivotally connected to the tractor by bolts 68. At their opposite ends bars 66' are connected to side bars 14 and 16 by bolts and nuts 70—72. A series of spaced openings 74 permit attachment of bars 66' in a number of positions to provide vertical adjustment of the hitch.

While I have shown and described a preferred form of my invention, it will be understood that variations in details of form may be made without departure from the invention as defined in the appended claims.

I claim:

1. A tractor hitch comprising frame bars adapted to be attached to a tractor at their forward ends, a lateral end cross bar interconnecting the other ends of said frame bars, an intermediate lateral cross bar interconnecting said frame bars intermediate their ends, said intermediate bar forming a vertical trackway on the forward side thereof, said trackway curving from the points of connection of said intermediate bar to said frame bars toward said end cross bar with the central portion of said trackway being closer to said end cross bar than the other portions of said trackway, said end cross-bar comprising upper and lower spaced parallel members, said lower member having a second trackway formed thereon on its forward side, said second trackway having a rearwardly extending portion formed in said lower member at the center thereof, a hitch bar having a roller pivotally connected to one end and engaged with the first mentioned trackway, a second roller attached to said hitch bar and engaged with the second mentioned trackway and seated in the rearwardly extending portion thereof, said lower member having a roughened rear edge, a pin attached to said hitch bar and having a roughened forward edge normally spaced from the roughened edge of said member engageable therewith upon movement of said hitch bar forwardly with respect to said member.

2. A tractor hitch comprising a pair of spaced members, each having a trackway formed on one side thereof, a hitch bar adapted to normally extend laterally of said members, one portion of said hitch bar being bifurcated, one of said members being received in said bifurcated portion and a roller mounted in said bifurcated portion in engagement with the trackway of said one of said members, a second roller pivotally mounted on said hitch bar and engaged with the trackway of the other of said members, the other of said members comprising two parallel elements vertically spaced, said hitch bar lying intermediate said two parallel members with the trackway of the other of said members being formed on the lower element thereof, the last named trackway having a rearwardly extending portion at the middle thereof extending away from the first mentioned trackway, said second roller being normally seated in said rearwardly extended portion, but being movable outwardly thereof and along said trackway of the other of said members upon movement of the first mentioned rollers along the first mentioned trackway.

3. A tractor hitch comprising a pair of spaced members, each having a trackway formed on one side thereof, a hitch bar adapted to normally extend laterally of said members, one portion of said hitch bar being bifurcated, one of said members being received in said bifurcated portion and a roller mounted in said bifurcated portion in engagement with the trackway of said one of said members, a second roller pivotally mounted on said hitch bar and engaged with the trackway of the other of said members, the other of said members comprising two parallel elements vertically spaced, said hitch bar lying intermediate said two parallel members with the trackway of the other of said members being formed on the lower element thereof, one of said elements having a roughened rear vertical surface, an upstanding element connected to said hitch bar having a roughened forward surface spaced from the first mentioned surface, said hitch bar being movable with respect to said members to mutually engage said roughened surface, the first mentioned trackway being curved with the middle portion of said first mentioned trackway being closer to the second mentioned trackway than the other portions thereof, said second mentioned trackway being straight and substantially tangent to the curve of the first mentioned trackway.

4. A tractor hitch comprising frame bars adapted to be attached to a tractor at their forward ends, a lateral end cross bar interconnecting the other ends of said frame bars, an intermediate cross bar interconnecting said frame bars intermediate their ends, said intermediate bar having a vertical trackway on the forward side thereof, said trackway curving from the points of connection of said intermediate bar to said frame bars toward said end cross bar with the central portion of said trackway being closer to said end cross bar than the other portions of said trackway, said end cross bar comprising upper and lower spaced parallel members, a second trackway formed on the forward side of said lower member, said second trackway being straight laterally of said frame bars, and a hitch bar having a roller pivotally connected at one end and engaged with the first mentioned trackway, a second roller attached to said hitch bar and engaged with the second mentioned trackway.

References Cited in the file of this patent

UNITED STATES PATENTS

| 1,502,033 | Hanson | July 22, 1924 |
| 2,110,114 | Smith | Mar. 1, 1938 |
| 2,506,773 | Bunting | May 9, 1950 |

FOREIGN PATENTS

| 111,565 | Australia | Oct. 3, 1940 |